US005992464A

United States Patent [19]

Cowell

[11] Patent Number: 5,992,464

[45] Date of Patent: Nov. 30, 1999

[54] PRE-COMPRESSION NITROX IN-LINE BLENDER

[76] Inventor: Ross A. Cowell, 2816 West 3rd Avenue, Vancouver, British Columbia, Canada, V6K 1M7

[21] Appl. No.: 09/004,854

[22] Filed: Jan. 9, 1998

[51] Int. Cl.[6] .......... F16K 5/00

[52] U.S. Cl. .......... 137/896; 137/897; 137/888; 137/892

[58] Field of Search .......... 137/896, 892, 137/897, 888; 366/107

[56] References Cited

U.S. PATENT DOCUMENTS

| | | | |
|---|---|---|---|
| 2,816,518 | 12/1957 | Daggett | 137/896 |
| 4,206,753 | 6/1980 | Fife | 366/107 |
| 4,219,038 | 8/1980 | Lubitzsch et al. | 137/7 |
| 4,270,576 | 6/1981 | Takeda et al. | 137/888 |
| 4,498,819 | 2/1985 | El-Saie | 137/896 |
| 4,860,803 | 8/1989 | Wells | 137/3 |
| 4,993,224 | 2/1991 | Phelps et al. | 137/896 |
| 5,611,845 | 3/1997 | Delp, II | 96/4 |

*Primary Examiner*—Denise L. Ferensic
*Assistant Examiner*—Joanne Y. Kim
*Attorney, Agent, or Firm*—Antony C. Edwards

[57] ABSTRACT

The pre-compression nitrox in-line blender of the present invention has, at an upstream end, an oxygen diffuser for diffusing into an annular cavity of the diffuser oxygen supplied into an innermost cavity from a selectively adjustable pressure regulator regulating a high pressure oxygen reservoir. The annular cavity of the oxygen diffuser communicates, by an air intake aperture in the diffuser, with ambient atmospheric air, whereby a low relative air pressure within the annular cavity draws the ambient atmospheric air through the air intake into the annular cavity. A downstream end of the annular cavity is mounted or mountable to, so as to communicate in unimpeded gaseous communication with, an upstream end of an in-line turbulent mixer. The turbulent mixer is mounted within a sealed conduit, which may be wholly or partly flexible along its length, for generally homogeneous mixing of the oxygen and the ambient atmospheric air so as to form homogeneous nitrox gas as the oxygen and the ambient atmospheric air pass through the turbulent mixer along the sealed gas conduit. A downstream end of the sealed gas conduit is mounted or mountable to, so as to communicate in unimpeded gaseous communication with, a compressor. An oxygen level monitor is mounted or mountable to the sealed gas conduit for sensing and reading out the oxygen level of the nitrox gas within the sealed gas conduit as the nitrox gas flows along the sealed gas conduit under the influence of reduced gas pressure within the sealed gas conduit and oxygen diffuser due to gas intake by the compressor.

15 Claims, 5 Drawing Sheets

PRE-COMPRESSION NITROX IN-LINE BLENDER

FIELD OF THE INVENTION

This invention relates to the field of nitrogen/oxygen mixtures for use in diving and, in particular, to an improved method of blending ambient air with oxygen in a pre-compression in-line motionless mixer to obtain fully homogeneous and consistent mixtures of nitrox gas, physically limited to a maximum oxygen concentration of 40%, instantaneously analysable, prior to entering a suitable compressor.

BACKGROUND OF THE INVENTION

Decompression-illness, or the "bends" is a well understood and serious medical condition experienced by divers being exposed to nitrogen forming in the blood stream as the diver ascends from the increased pressure experienced at depth. The amount of nitrogen forming is a direct result of the amount of nitrogen in the air stored in a diver's tanks and breathed at depth.

It is now understood that the use of air having reduced amounts of nitrogen decreases the incidence and seriousness of the bends medical condition. First developed by the National Oceanographic and Atmospheric Association (NOAA), so called "nitrox" gases having reduced levels of nitrogen were found to reduce the bends. Ambient atmospheric air has generally a 21% oxygen content at sea level and a corresponding 79% nitrogen content. Nitrox, as developed, was primarily 32% and 36% oxygen, having correspondingly decreased levels of nitrogen.

Nitrox may be manufactured by mixing pure oxygen with ambient atmospheric air. The NOAA developed a gas blending method in an attempt to get consistent, safe mixtures of nitrox. Presently the nitrox gas blending standards have been established by the International Association of Nitrox and Technical Divers (IANTD), and are based on the United States federal regulations as specified by NOAA, Occupational Safety and Health Association (OSHA), the United States Navy and the United States Coastguard.

The popularity of nitrox gas for diving has increased and subsequently created a demand in recreational and commercial diving operations and the like to be able to provide nitrox gas in remote locations for use by divers when refilling their tanks.

Applicant is aware that in the prior art NOAA gas blending method nitrox gases are not blended consistently thoroughly so as to mix the oxygen with the ambient air homogeneously. The NOAA method employs a continuous mixing device having mixing coils which attempt to blend the gases prior to entry in the compressor. The NOAA method has the disadvantage that an existing compressor has to be replaced or heavily modified and it has been found that streams of pure oxygen may flow into the compressor unmixed.

The method and apparatus of the present invention is designed to meet IANTD safety standards, preferably in a nitrox mixture having an oxygen concentration of less than 40%, where the nitrox is blended prior to being fed into the compressor.

Thus it is an object of the present invention to provide an apparatus and method for in-line blending of ambient atmospheric air with concentrated oxygen in a pre-compression turbulent mixing chamber and monitoring the level of oxygen in the resulting homogeneously blended nitrox so that the high concentration oxygen supply may be finely regulated to provide the desired nitrox concentrations.

It is a further object of the present invention to provide a simplified nitrox blending device to provide safe operation and accurate nitrox mixtures.

Applicant is aware of U.S. Pat. No. 4,860,803 which issued to Wells on Aug. 29, 1989. Wells teaches injecting oxygen into a stream of ambient air in order to produce an oxygen enriched air mixture. The mixture is then compressed and delivered to storage or scuba cylinders for use in diving or other applications. Wells requires a source of oxygen appropriate for injection into the ambient airstream and therefore a great deal of caution is required during generation of the oxygen enriched air mixture to avoid explosions and other problems typically associated with the use of oxygen.

Applicant is also aware of U.S. Pat. No. 5,611,845 which issued to Delp on Mar. 18, 1997. Delp teaches generating oxygen enriched air by use of a permeable membrane gas separation system for separating a nitrous gas component and an oxygen enriched air component from compressed air.

In the '803 patent, Wells teaches mixing ambient air with injected oxygen in a gas mixing coil. In applicant's experience, this method of mixing is problematic in that the flow through the mixing coil remains laminar resulting in poor mixing that is not detected before the gas enters the compressor. Consequently unmixed entrained oxygen can result in combustion in the compressor especially if sufficient oxygen is injected in an attempt to obtain 40% oxygen levels in the final nitrox mix. In the '845 patent, Delp discloses producing nitrox gas by removing a portion of the nitrogen content from ambient air. The use of a vortex tube is taught for dividing the nitrogen gas component into hot and cold nitrogen gas streams.

SUMMARY OF THE INVENTION

The pre-compression nitrox in-line blender of the present invention has, at an upstream end, an oxygen diffuser for diffusing into an interior annular cavity of the diffuser, oxygen supplied into an innermost cavity within the annular cavity from a selectively adjustable pressure regulator reducing a high pressure oxygen reservoir. The annular cavity of the oxygen diffuser communicates, by an air intake aperture in a diffuser shroud, with ambient atmospheric air, whereby the compressor generated low relative air pressure within the annular cavity draws the ambient atmospheric air through the air intake into the annular cavity. The annular and innermost cavities in the oxygen diffuser are separated by fine stainless steel mesh which acts as both a pre-filter and flash screen. Oxygen is diffused from the innermost cavity into the annular cavity where the oxygen pre-mixes or pre-blends with the ambient air.

A downstream end of the interior cavity is mounted or mountable to, so as to communicate in unimpeded gaseous communication with, an upstream end of a multi-element in-line turbulent mixer. The turbulent mixer is mounted within a sealed conduit, which may be wholly or partly flexible along its length, for homogeneous mixing of the oxygen and the ambient atmospheric air so as to form nitrox gas as the oxygen and the ambient atmospheric air pass through the turbulent mixer along the sealed gas conduit.

A downstream end of the sealed gas conduit is mounted or mountable to, so as to communicate in unimpeded gaseous communication with, a compressor. An oxygen level sensor is mounted or mountable to the sealed gas conduit for sensing and reading out the oxygen level of the homogeneous nitrox gas within the sealed gas conduit as the nitrox gas flows along the sealed gas conduit under the influence of reduced gas pressure within the sealed gas conduit and oxygen diffuser due to gas intake by the compressor.

Advantageously, a lockingly adjustable metering valve is mounted or mountable upstream of the oxygen diffuser, in-line between the high pressure oxygen reservoir and the diffuser, so as to limit the oxygen level. Further advantageously, the oxygen diffuser is an air filter having the interior annular cavity extending therethrough. The air filter may be cylindrical and the ambient atmospheric air may be drawn through cylindrical walls of the air filter. The air filter may be a sump filter of concentric chamber design.

In one aspect of the present invention the in-line turbulent mixer is mounted within a rigid upstream segment of the sealed gas conduit and comprises rigid alternating stators mounted in the gas flow path within the sealed gas conduit. The stators are formed as radially extending blades, extending radially outwardly of a generally centroidal longitudinal line of symmetry of the sealed gas conduit, where the blades helically spiral in a downstream direction relative to the centroidal longitudinal line of symmetry. In a further aspect, the centroidal longitudinal line of symmetry is generally linear. The helical elements rotate 180° in a bisecting arrangement, so as to alternate direction of rotation of the gas flow.

The method of pre-compression blending of nitrox of the present invention includes the steps of:

(a) regulating and limiting a stream of high pressure oxygen into a diffuser (b) diffusing the stream of high pressure oxygen within the diffuser, (c) drawing ambient air into the diffuser so as to pre-mix the ambient air with the flow of low pressure oxygen so as to form a pre-mixed gas blend, (d) homogeneously turbulently mixing the pre-mixed gas blend, downstream of the diffuser, within an in-line low flow restriction turbulent mixer to form pre-compression nitrox gas, (e) approximately instantaneously monitoring oxygen level within the pre-compression nitrox gas by a oxygen level monitor or sensor, and, (f) feeding the pre-compression nitrox gas into a compressor.

DETAILED DESCRIPTION OF THE PREFERRED EMBODIMENT

Figure 1:
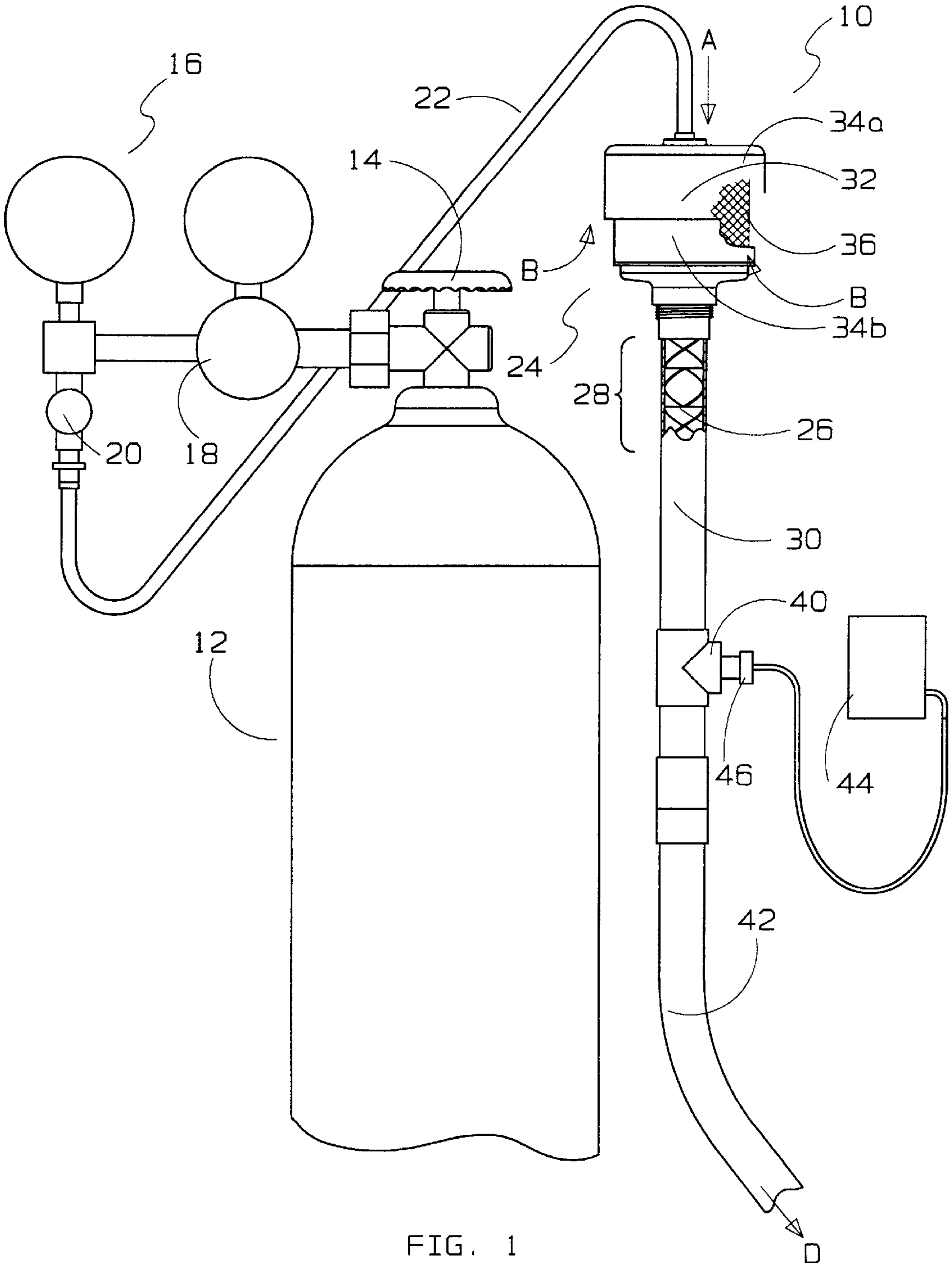
FIG. 1 is, in front elevation view, a pre-compression nitrox in-line blender system of the present invention.
Figure 2:
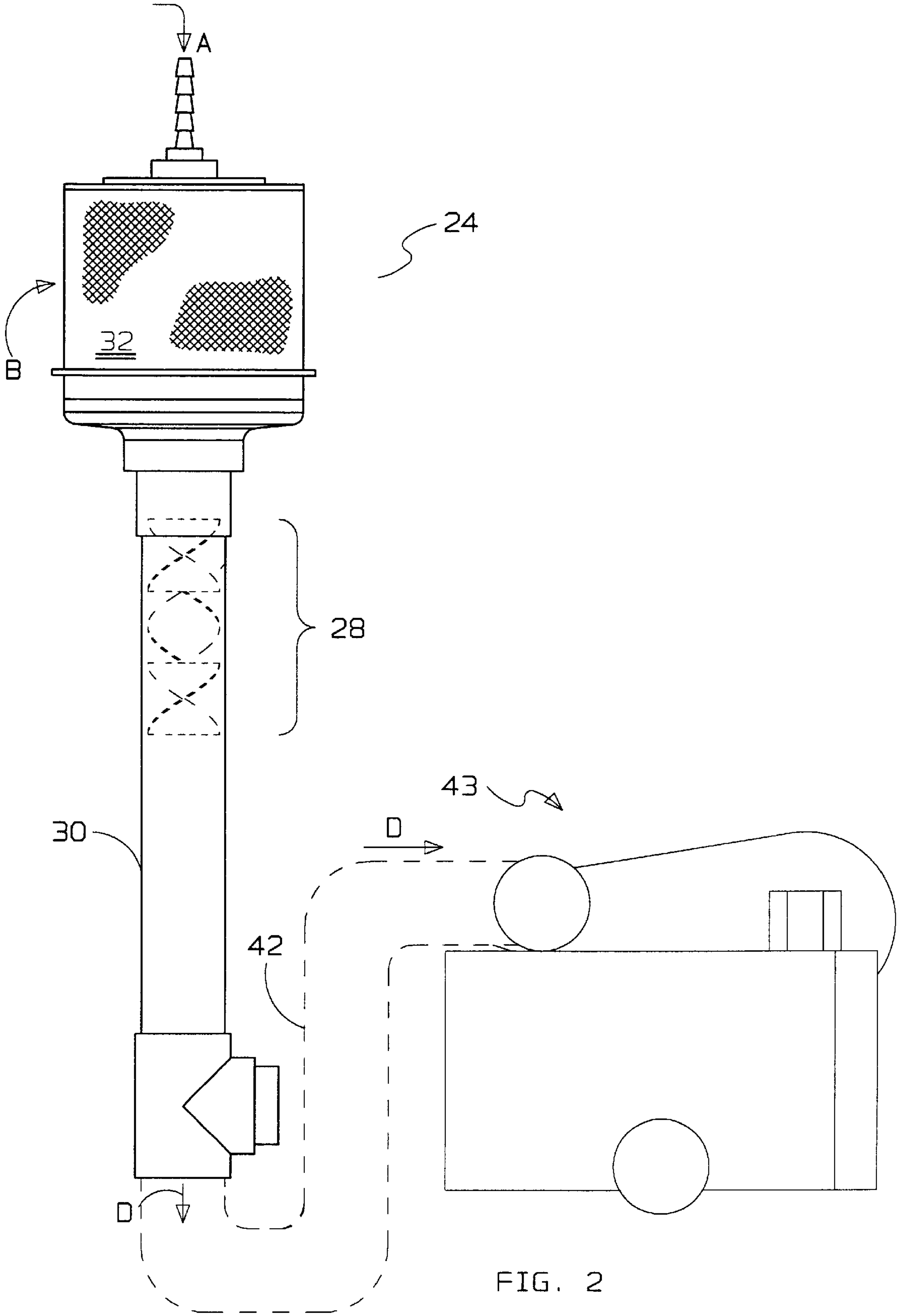
FIG. 2 is, in front elevation view, the blending unit of the pre-compression nitrox in-line blender system of FIG. 1.
Figure 3:
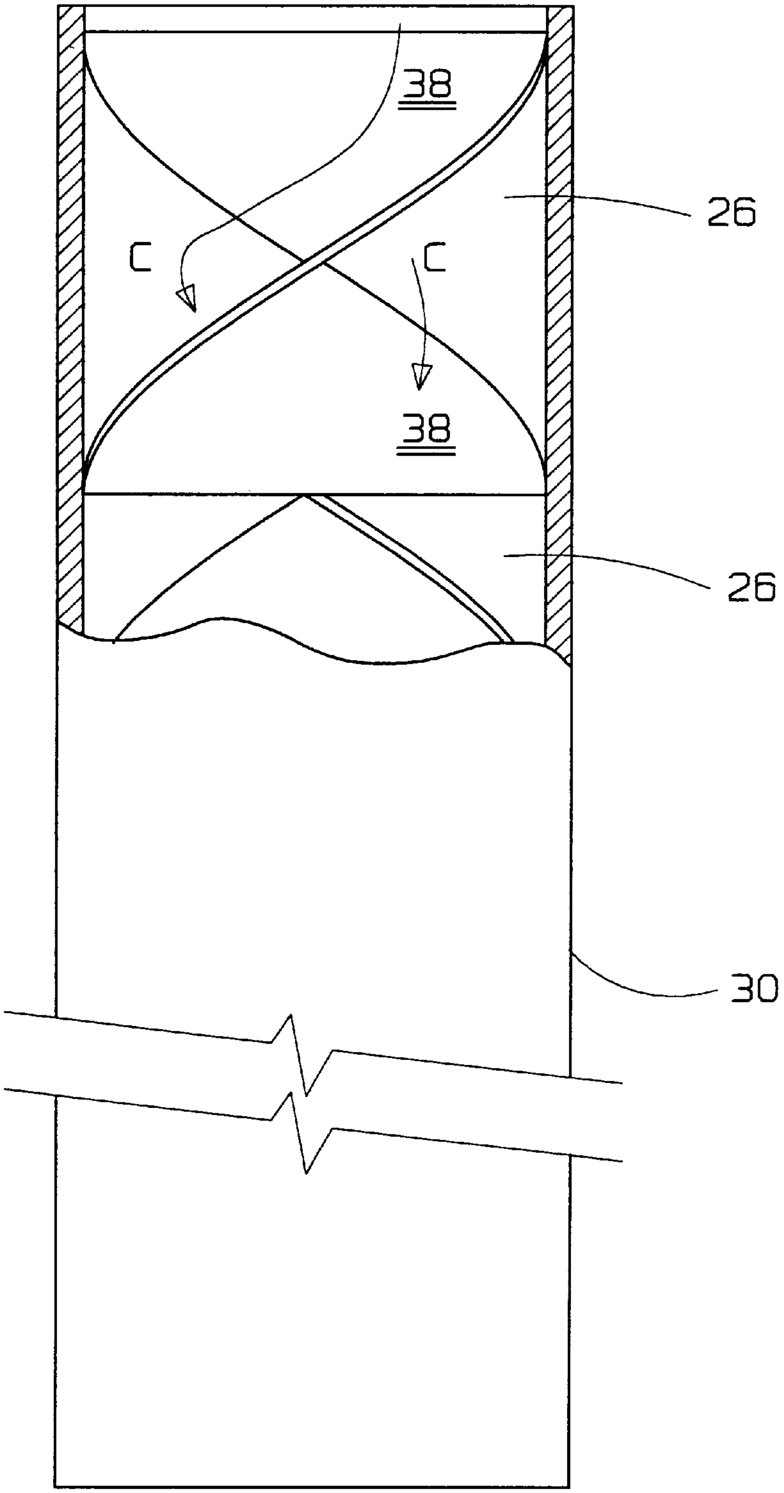
FIG. 3 is, in partially cut-away front elevation view, the in-line mixer of FIG. 1.

As best seen in FIGS. 1–3, the pre-compression nitrox in-line blender of the present invention is indicated generally by the numeral 10. The process of blending ambient atmospheric air with oxygen is, in a sense, linear, and so the components of the system of the present invention will be described initially starting at the upstream end.

Thus, as seen in FIG. 1, high pressure storage tank 12 is used to store high concentration, gaseous oxygen. Oxygen is passed via high pressure valve 14 to regulator 16. Flow of oxygen through regulator 16 is governed by regulator valve 18 and metering valve 20. Low pressure oxygen flows through metering valve 20 and supply line 22 so as to enter pre-blender diffuser 24 in direction A. The oxygen supply from supply line 22 passes through the innermost cavity (not shown) extending at least partially the length of pre-blender diffuser 24 so as to enter an annular chamber 26 which is internal and concentric to the pre-blenders outermost mesh filter.

Pre-blender diffuser 24 is concentrically lined around its circumference by mesh filter 32. Mesh filter 32 may be covered by a cowling or shroud so long as ambient atmospheric air is allowed to pass through mesh filter 32 into the longitudinal cavity of pre-blender diffuser 24. As illustrated, the cowling or shroud may be upper shroud 34*a* and lower shroud 34*b* sized so as to provide annular air flow aperture 36 through which ambient atmospheric air may be drawn in direction B. The cowling or shroud protects from air currents, such as breezes, passing into the diffuser so as to dilute the oxygen content of the air/oxygen blend. Ambient atmospheric air passes through mesh filter 32 drawn by the low air pressure within the central cavity of pre-blender diffuser 24. Oxygen entering into pre-blender diffuser 24 in direction A and ambient atmospheric air in direction B commences mixing within the longitudinal annular cavity within pre-blender diffuser 24. Final homogeneous mixing occurs as the pre-mixed oxygen and ambient atmospheric air is drawn along and through static mixer 26 within mixing section 28 of tube 30 under the influence of a low pressure vacuum formed downstream within the gas compressor (not shown).

Figure 5:
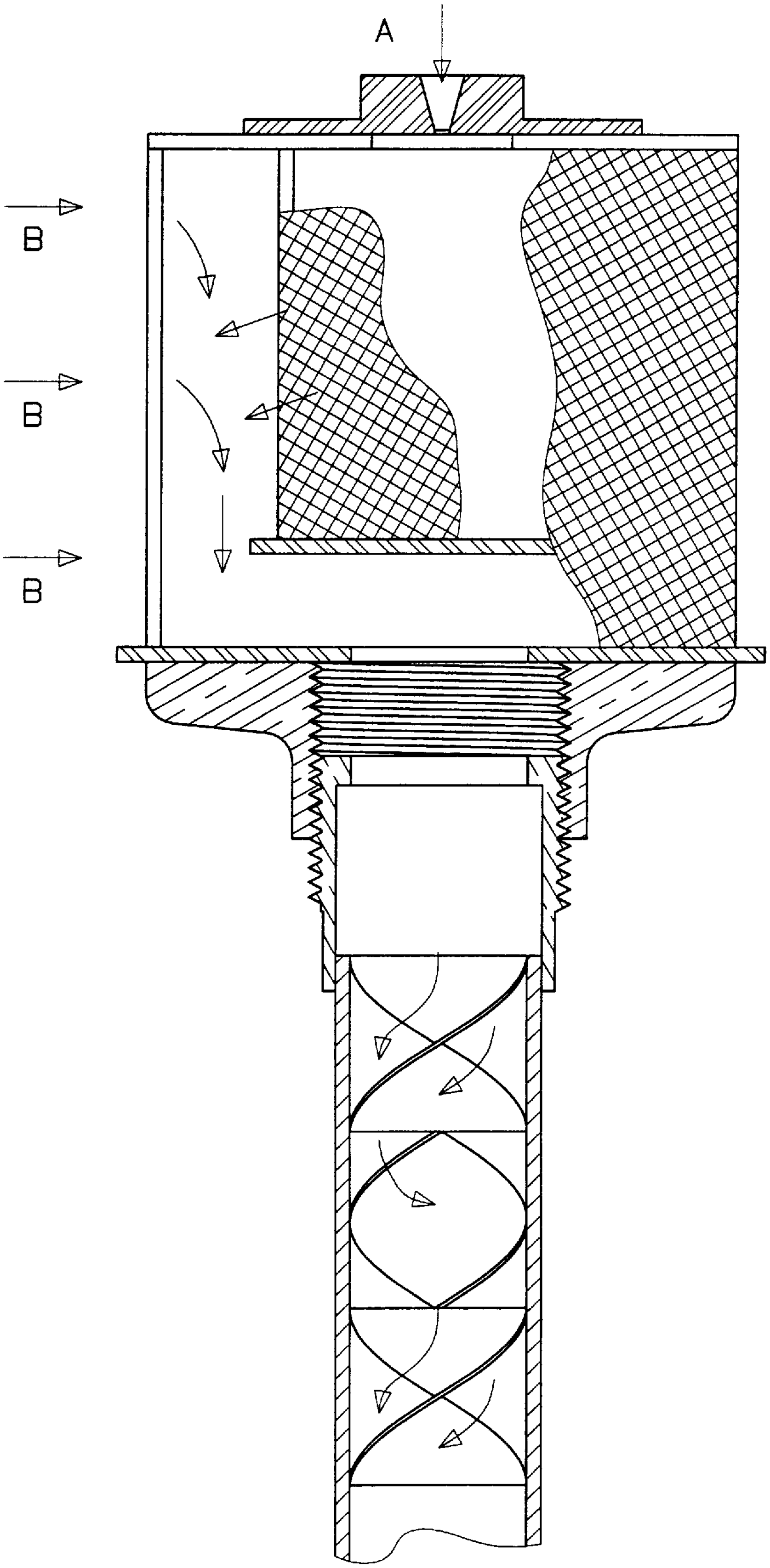
FIG. 5 is, in partially cut-away front elevation view, the diffuser and in-line blender of the present invention.

Better seen in FIGS. 3 and 5, static mixer 26 contains helically spiralled mixing stator vanes 38 over which the oxygen and ambient atmospheric air are drawn in Direction C so as to turbulently mix the gases into a homogeneous mixture within the length of mixing section 28. Advantageously the length of each stator vane 38 is 1.5 times the diameter of mixing section 28. Helically spiralled stator vanes 38 each spiral so as to sweep out a radial arc of 180 degrees. Adjacent stator vanes 38 spiral in opposite directions, so that, for example, a first upstream stator vane 38 rotates in a clockwise direction and the next downstream adjacent stator vane 38 rotates in a counter-clockwise direction. The adjacent ends of adjacent stator vanes 38 are radially offset from each other by 90 degrees. Three adjacent in-line stator vanes 38 may be employed to complete homogeneous mixing of the air/oxygen pre-mix from the diffuser. The objective is complete homogeneous mixing without introducing a flow restriction which may cause a back pressure. A back pressure in the feed line to the compressor may mean using a compressor of greater power to provide equivalent compression, or a reduction in compression capability.

The resulting fully homogeneous gas mixture is nitrox gas which is then drawn in direction D into the compressor 43 through the remaining length of tube 30, T-coupling 40 and flexible tubing 42. The nitrox gas is compressed within the compressor for high pressure delivery into high pressure nitrox scuba tanks used by divers.

Oxygen levels within the nitrox gas are monitored by oxygen analyser 44 which monitors the oxygen concentration within the nitrox gas passing sensor 46 mounted to T-coupling 40.

The high pressure oxygen source may be typically “K” or “T” cylinders having a working pressure of up to 2400 psi.

Figure 4:
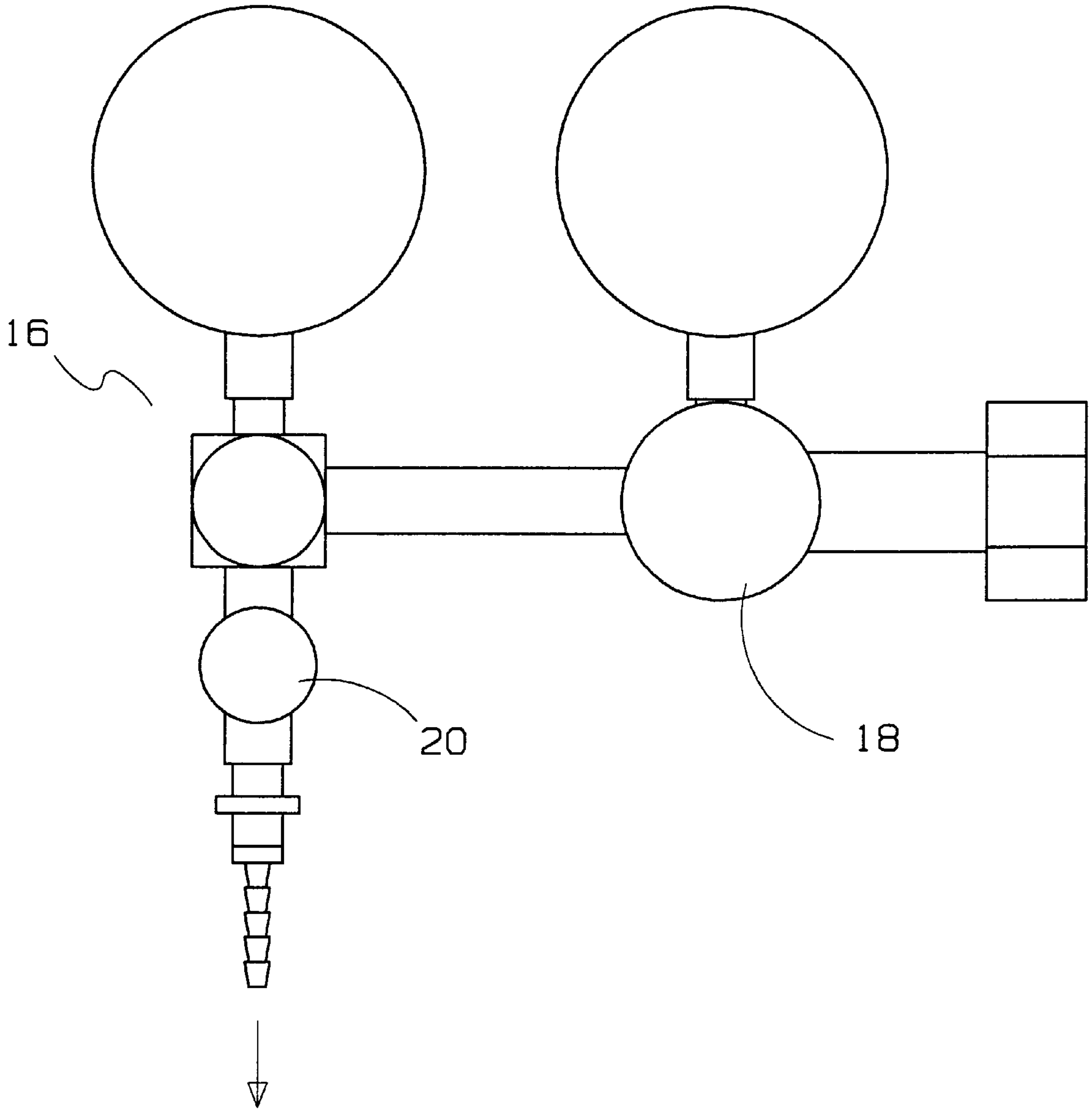
FIG. 4 is, the oxygen regulator components of FIG. 1.

The high pressure regulator is a conventional high pressure oxygen regulator, better seen in FIG. 4, such as the Western Medica model M1-540-15FG diaphragm regulator. The regulator is attached to the high pressure oxygen source cylinder conventionally by way of a CGA540 fitting.

Metering valve 20 may be a locking metering valve such as the L series metering valves commercially supplied by Nupro Company of Willoughby, Ohio, U.S.A. The metering valve is used as a flow restrictor so as to allow full use of the regulators' pressure adjustment control to selectively adjust the oxygen percentage of the nitrox being mixed within tube 30, while assuring the maximum oxygen concentration of 40% with the compressor at operating load. The oxygen supply line 22 may be a conventional low pressure (150 psi) oxygen hose.

The pre-blender diffuser 24, the mixing section 28, the oxygen analyser 44 and sensor 46 are advantageously mounted securely near the compressor and coupled to the compressor intake via a short length of flexible tubing 42, which acts to isolate the compressor vibration from the blender and sensor unit. Also advantageously, sufficient clearance should be provided around pre-blender diffuser 24 so as to allow unrestricted flow of ambient atmospheric air into the diffuser and to allow ventilation for the dispersal of vented oxygen should the compressor stop before the oxygen flow is shut off. Venting of oxygen in the event of compressor shut down prevents the formation of a slug of oxygen which would otherwise pass into the compressor. Within the pre-blender diffuser 24, the mesh filter 32 may be a dual element sump filter (series SU) such as provided commercially by the Marion Manufacturing Company Inc. of Cleveland, Ohio, U.S.A. The dual elements are concentric cylindrical stainless steel mesh, 100×150 micron filters, the outer being pleated. Oxygen flows into the innermost cavity, that is, into the cavity in the inner element, and passes through the filter into the annular cavity formed between the inner element and the outer element, as seen in FIG. 5.

Oxygen analyser 44 may be of the portable remote sensor type such as the MSA Mineox I Galvonic Fuel Sensor supplied by MSA Catalyst Research of Owings Mills, Md. U.S.A., or may be such as Teledyne TED-60 or that commercially supplied by Aquatronics in the United Kingdom.

The static mixer 26 may be a Statiflo™ motionless mixer, series 400, having fixed elements of PVC or cPVC, construction such as supplied by Continuous Process Industries of Willowdale, Ontario, Canada The flow requirements of the compressor will dictate the flow requirements of the nitrox in-line blender system of the present invention. As an example, tubing 30, which may be SCH80 PVC, may be of 1" diameter for a 3.5–18 CFM capacity or of a 1.5" diameter at 15–30 CFM capacity.

The compressor may be of a conventional type suitable for compressing nitrox gas having up to 40% oxygen concentration. The compressor may be of the oil-free type, or of a more conventional lubrication design, utilizing a lubricant suitable for use in environments with up to 40% oxygen concentration.

The following steps may be taken to blend up to 40% nitrox using the nitrox in-line blender system of the present invention: Start the compressor. Open a fill whip. Turn on the oxygen analyser and calibrate to 20.9%, being the entrained ambient atmospheric oxygen content. Ensure the oxygen regulator control is fully closed. Slowly and completely open the oxygen source high pressure valve 14. Slowly open the oxygen regulator control valve 18 while monitoring the oxygen analyser 44 readout for the desired oxygen percentage, such as 32% or 36%, allowing 10 to 15 seconds for the oxygen analyser to register the initial oxygen concentration. Also allow for the lag time required for the system to purge itself of any stale nitrox used in previous pre-compression mixing. Attach the fill whip to a scuba nitrox tank or bank tanks. Fill the tank or tanks to the desired pressure. Turn off the high pressure oxygen storage tank 12 by closing high pressure valve 14, and back off the regulator valve 18. Turn off the compressor.

This method, and the apparatus if properly installed, calibrated and maintained, may be used to repeatedly and consistently produce a selected desired blending of oxygen with ambient atmospheric air to supply nitrox gas having consistent levels of oxygen for the purpose of providing nitrox used for breathing while diving. In use, the percentage blend may go out of calibration when a change in pressure drop occurs on the inlet air side, as for example, by partial plugging of the mesh filter 32 on the pre-blended diffuser 24. Thus, it is advantageous that the oxygen content be continuously monitored using the oxygen analyser 44 during the mixing process and doing also an oxygen analysis of the scuba tank contents at the completion of filling so as to compare the readings for any discrepancy.

So as not to be limiting, it is to be noted that the recommendation within this specification that oxygen concentrations be kept to 40% or below, is so that the method of the present invention falls within the currently accepted industry practice that gases having concentrations of 40% oxygen or below can be treated as ambient air rather than requiring oxygen service standards (currently required for oxygen concentrations greater than 40%). Thus the present invention allows safe mixing of oxygen and ambient air within a low (below 200 psi) environment within a pre-compression mixing chamber that does not have to comply with oxygen service standards. The mixing apparatus and method of the present invention also enables mixing of nitrox having oxygen levels greater than 40%.

It is to be further understood, that it is within the scope of the present invention to replace the oxygen source with a helium gas source so as to produce "trimix", that is, a blend of oxygen, helium and nitrogen, wherein a separate oxygen supply may be blended so as to top-up the oxygen level.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A pre-compression nitrox in-line blender, comprising at an upstream end, an oxygen diffuser for diffusing into an interior cavity of said diffuser oxygen supplied into said interior cavity from a selectively adjustable pressure regulator regulating a high pressure oxygen reservoir, said interior cavity of said oxygen diffuser communicating, by an air intake in said diffuser, with ambient atmospheric air, whereby a low relative air pressure within said interior cavity draws said ambient atmospheric air through said air intake into said interior cavity, a downstream end of said interior cavity mountable to, so as to communicate in unimpeded gaseous communication with, an upstream end of an in-line turbulent mixer, said turbulent mixer mounted within a sealed conduit for homogeneous mixing of said oxygen and said ambient atmospheric air so as to form nitrox gas as said oxygen and said ambient atmospheric air pass through said turbulent mixer along said sealed as conduit, a downstream end of said sealed gas conduit mountable to, so as to communicate in unimpeded gaseous communication with, a compressor, an oxygen level monitor mountable to said sealed gas conduit for sensing and reading out oxygen levels of said nitrox gas within said sealed gas conduit as said nitrox gas flows along said sealed gas conduit under the influence of reduced gas pressure within said sealed gas conduit and oxygen diffuser due to gas intake by said compressor, wherein said in-line turbulent mixer is rigidly mounted within an upstream segment of said sealed gas conduit and comprises rigid stators rigidly mounted in a gas flow path within said sealed gas conduit for homogeneous turbulent mixing of said nitrox gas.

2. The device of claim 1 wherein said rigid stators are an in-line adjacently end-to-end array of radially extending helical blades, said array of radially extending helical blades extending radially outwardly of a generally centroidal longitudinal line of symmetry of said sealed gas conduit, said array of radially extending helical blades helically spiralled in a downstream direction relative to said centroidal longitudinal line of symmetry adjacent end-to-end blades in said array of radially extending helical blades having alternating directions of spiralled rotation.

3. The device of claim 2 wherein said centroidal longitudinal line of symmetry is generally linear.

4. The device of claim 1 further comprising a lockable metering valve mounted upstream of said oxygen diffuser, in-line between said high pressure oxygen reservoir and said diffuser, so as to further limit maximum attainable said oxygen levels.

5. The device of claim 1 wherein said oxygen diffuser is a concentric multi-element filter having said interior cavity extending therethrough, and wherein said interior cavity is annular between inner and outer elements of said multi-element filter.

6. The device of claim 5 wherein said ambient atmospheric air is drawn through walls of said air filter.

7. The device of claim 6 wherein said air filter is a concentric, duel element sump filter.

8. A pre-compression nitrox in-line blender, comprising, in combination, at an upstream end, an oxygen diffuser for diffusing into an interior cavity of said diffuser oxygen supplied into said interior cavity from a selectively adjustable pressure regulator regulating a high pressure oxygen reservoir, said interior cavity of said oxygen diffuser communicating, by an air intake aperture in said diffuser, with ambient atmospheric air, whereby a low relative air pressure within said interior cavity draws said ambient atmospheric air through said air intake into said interior cavity, a downstream end of said interior cavity mountable to, so as to communicate in unimpeded gaseous communication with, an upstream end of an in-line turbulent mixer, said turbulent mixer mounted within a sealed conduit for generally homogeneous mixing of said oxygen and said ambient atmospheric air so as to form nitrox gas as said oxygen and said ambient atmospheric air pass through said turbulent mixer along said sealed gas conduit, a downstream end of said sealed gas conduit mountable to, so as to communicate in unimpeded gaseous communication with, a compressor, an oxygen level monitor mountable to said sealed gas conduit for sensing and reading out oxygen level of said nitrox gas within said sealed gas conduit as said nitrox gas flows along said sealed gas conduit under the influence of reduced gas pressure within said sealed gas conduit and oxygen diffuser due to gas intake by said compressor, wherein said in-line turbulent mixer is rigidly mounted within an upstream segment of said sealed gas conduit and comprises rigid stators rigidly mounted in a gas flow path within said sealed gas conduit for homogeneous turbulent mixing of said nitrox gas.

9. The device of claim 8 wherein said rigid stators are an in-line adjacently end-to-end array of radially extending helical blades, said array of radially extending helical blades extending radially outwardly of a generally centroidal longitudinal line of symmetry of said sealed gas conduit, said array of radially extending helical blades helically spiralled in a downstream direction relative to said centroidal longitudinal line of symmetry, adjacent end-to-end blades in said array of radially extending helical blades having alternating directions of spiralled rotation.

10. The device of claim 9 wherein said centroidal longitudinal line of symmetry is generally linear.

11. The device of claim 8 further comprising a lockable metering valve mountable upstream of said oxygen diffuser, in-line between said high pressure oxygen regulator and said diffuser, so as to further precisely limit said oxygen level.

12. The device of claim 8 wherein said oxygen diffuser is a filter having said cavity extending therethrough.

13. The device of claim 12 wherein said ambient atmospheric air may be drawn through walls of said air filter.

14. The device of claim 13 wherein said air filter is a concentric, duel element, sump filter, and said interior cavity is an annular cavity.

15. In a pre-compression nitrox in-line blender, including, at an upstream end, an oxygen diffuser for diffusing into an interior cavity of said diffuser oxygen supplied into said interior cavity from a selectively adjustable pressure regulator regulating a high pressure oxygen reservoir, said interior cavity of said oxygen diffuser communicating, by an air intake aperture in said diffuser, with ambient atmospheric air, whereby a low relative air pressure within said interior cavity draws said ambient atmospheric air through said air intake into said interior cavity, a downstream end of said interior cavity mountable to, so as to communicate in unimpeded gaseous communication with, an upstream end of an in-line turbulent mixer, said turbulent mixer rigidly mounted within a sealed conduit for generally homogeneous mixing of said oxygen and said ambient atmospheric air so as to form nitrox as as said oxygen and said ambient atmospheric air pass through said turbulent mixer along said sealed gas conduit, a downstream end of said sealed gas conduit mountable to, so as to communicate in unimpeded gaseous communication with, a compressor, an oxygen level monitor mountable to said sealed gas conduit for sensing and reading out oxygen level of said nitrox gas within said sealed gas conduit as said nitrox gas flows along said sealed gas conduit under the influence of reduced as pressure within said sealed gas conduit and oxygen diffuser due to gas intake by said compressor, a method of pre-compression blending of nitrox comprising the steps of:

(a) regulating and limiting a stream of high pressure oxygen into a diffuser, (b) diffusing said stream of low pressure oxygen within said diffuser, (c) drawing ambient air into said diffuser so as to pre-mix said ambient air with said stream of low pressure oxygen so as to form a pre-mixed as blend, (d) turbulently homogeneously mixing said pre-mixed gas blend downstream of said diffuser, within said in-line turbulent mixer to form said nitrox gas, by alternating a spiralled direction of flow of said pre-mixed gas along an adjacent end-to-end array of helical blades having alternatingly spiralled blades rigidly mounted within said in-line turbulent mixer, (e) monitoring oxygen level within said nitrox gas by said oxygen level monitor, and, (f) feeding said nitrox gas into a compressor.

* * * * *